United States Patent
Zand et al.

(10) Patent No.: US 11,470,450 B2
(45) Date of Patent: Oct. 11, 2022

(54) OPTIMIZED SECURE PHASE-BASED POSITIONING

(71) Applicant: Cypress Semiconductor Corporation, San Jose, CA (US)

(72) Inventors: Pouria Zand, San Jose, CA (US); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/179,754

(22) Filed: Feb. 19, 2021

(65) Prior Publication Data

US 2022/0201431 A1    Jun. 23, 2022

Related U.S. Application Data

(60) Provisional application No. 63/127,929, filed on Dec. 18, 2020.

(51) Int. Cl.
| | |
|---|---|
| *H04W 4/029* | (2018.01) |
| *G01S 13/76* | (2006.01) |
| *G01S 13/84* | (2006.01) |
| *H04W 72/04* | (2009.01) |

(52) U.S. Cl.
CPC ........... *H04W 4/029* (2018.02); *G01S 13/765* (2013.01); *G01S 13/84* (2013.01); *H04W 72/0446* (2013.01)

(58) Field of Classification Search
CPC . H04W 4/029; H04W 72/0446; G01S 13/765; G01S 13/84
See application file for complete search history.

(56) References Cited

U.S. PATENT DOCUMENTS

| | | | | |
|---|---|---|---|---|
| 2006/0279461 | A1* | 12/2006 | Zimmerman | G01S 19/11 342/464 |
| 2019/0208387 | A1* | 7/2019 | Jiang | H04W 72/044 |
| 2020/0132829 | A1* | 4/2020 | Jiang | G01S 13/762 |

OTHER PUBLICATIONS

T. Motos, "Protection Against EDLC", Texas Instruments, Bluetooth SIG Bluetooth, Apr. 25, 2019; 9 pages.

* cited by examiner

*Primary Examiner* — Kabir A Timory

(57) ABSTRACT

Disclosed are techniques for time-multiplexing between sensing and adjacent signal transmission functionalities on the same hardware platform, such as a chipset supporting a main ranging device in passive entry passive start (PEPS) applications using secure multi-carrier phase-based ranging solutions to estimate the range between the main ranging device and a target device. The supporting chipset may be configured to operate as a sensor to receive continuous tone (CT) signals or round-trip time (RTT) packets exchanged between the main ranging device and the target device in a timeslot of a ranging cycle to improve the accuracy of the range estimates. In a different timeslot, the supporting device may operate as a transmitter to transmit CT signals or RTT packet on a channel adjacent to the channel used by the main ranging device to protect the CT signals or the RTT packets transmitted from the main ranging device against symbol level attacks.

20 Claims, 15 Drawing Sheets

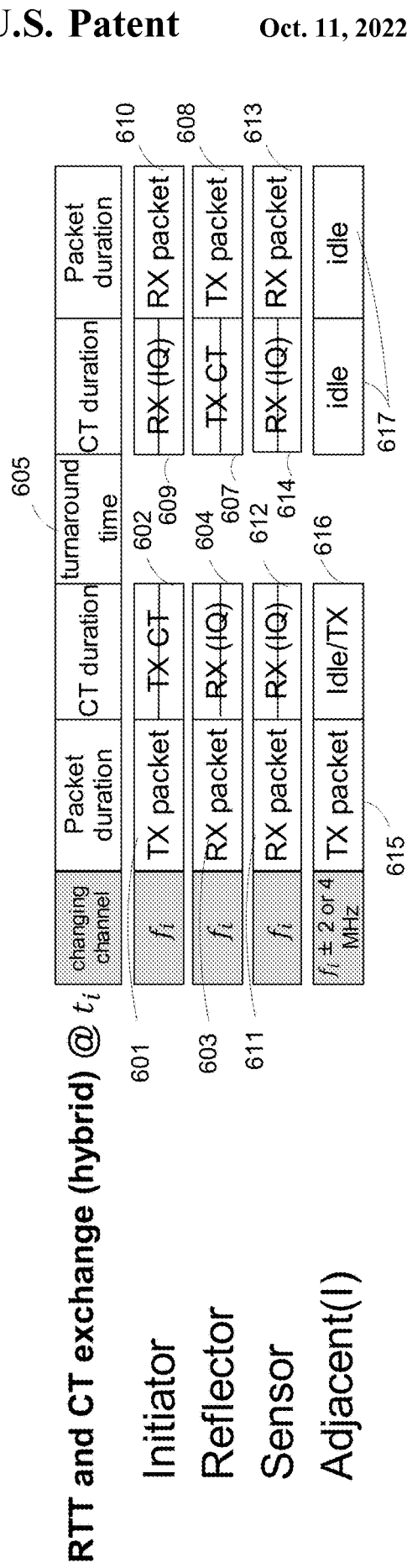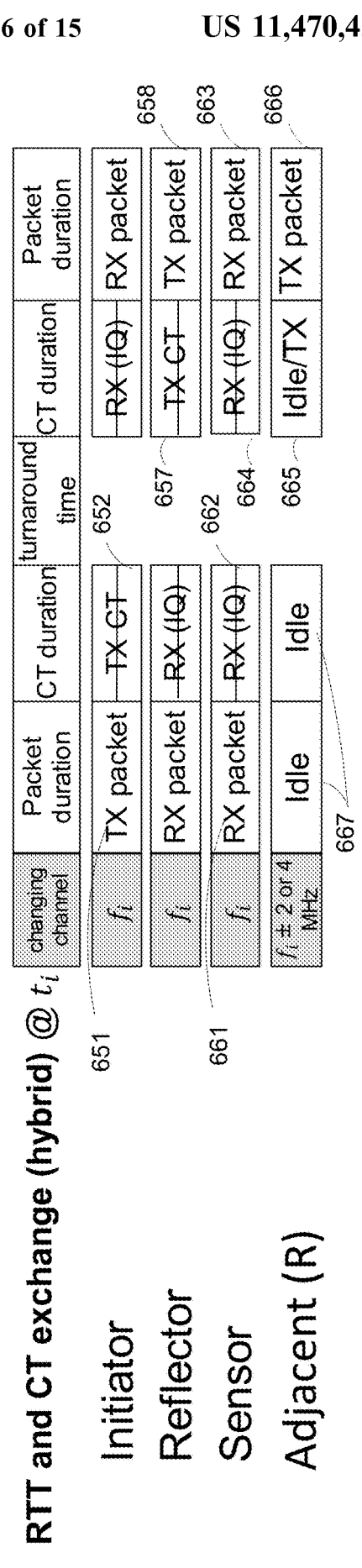
FIG. 6A
FIG. 6B

US 11,470,450 B2

OPTIMIZED SECURE PHASE-BASED POSITIONING

CROSS REFERENCE TO RELATED APPLICATION

This application claims the benefit of U.S. Provisional Application No. 63/127,929, filed on Dec. 18, 2020, the disclosure of which is incorporated herein by reference in its entirety.

TECHNICAL FIELD

This disclosure generally relates to technologies for positioning and ranging using short-range narrow-band wireless signals, and more particularly, to methods and systems to provide sub-meter accuracy and secure distance measurements for positioning and ranging application using narrow-band radios such as Bluetooth technologies.

BACKGROUND

Secured entry and access to personal properties and restricted areas is increasingly relying on the use of remote digital keys. One solution is Passive Entry Passive Start (PEPS) application that provides sub-meter accuracy and secure distance measurement for positioning a car key using narrow-band radios such as Bluetooth Low Energy (BLE) or IEEE 802.15.4. In one implementation of the PEPS application, a main hub and multiple sensors on a car measure the angles of arrival/directions of arrival (e.g., AoA/DoA in Bluetooth Core Specification 5.1) and received signal strength indicator (RSSI) information from a key to estimate the position of the key. However, the security of using AoA/DoA and RSSI for positioning has not been well studied and may require the exchange of security information at the application and software level. It is desired to improve the accuracy and security of ranging and positioning remote digital keys using PEPS application.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6A illustrates the states in a hybrid timeslot of a secure phase-based ranging cycle in which the main hub acts as the initiator, the key acts as the reflector, and the supporting chipsets may act as a sensor or an adjacent signal transmitter, in accordance with one aspect of the present disclosure;

FIG. 6B illustrates the states in a hybrid timeslot of a secure phase-based ranging cycle in which the main hub acts as the reflector, the key acts as the initiator, and the supporting chipsets may act as a sensor or an adjacent signal transmitter, in accordance with one aspect of the present disclosure;

DETAILED DESCRIPTION

Figure 1:
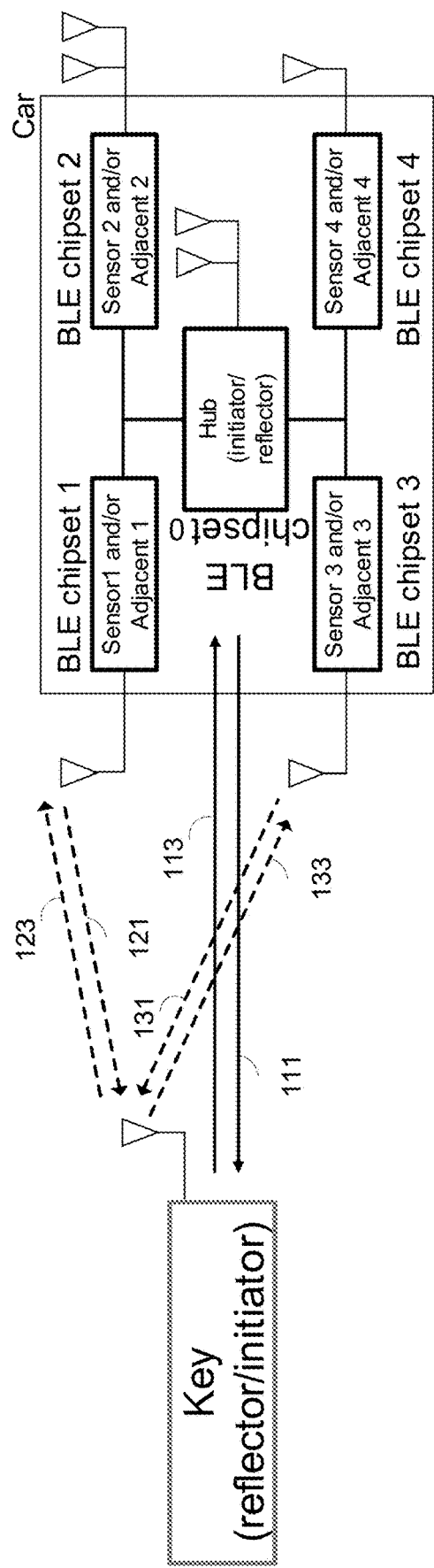
FIG. 1 is a block diagram that illustrates an application of secure phase-based ranging for car-key positioning, in which the functionalities for sensing and adjacent signal transmission are shared in the same chipset, in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

One implementation of the PEPS application uses secure multi-carrier phase-based ranging for distance measurement and positioning, in which the two-way phase difference between two devices is measured over multiple carriers. In phase-based ranging, the two devices, the initiator and the reflector, exchange multiple constant tones (CT) over different carrier frequencies to mitigate multi-path fading and interference. The initiator is the device that initiates the ranging and the reflector is the device that responds to the initiator request. In applications using phase-based ranging for positioning a car key, multiple sensors (e.g., four sensors) may be installed around the car to improve the accuracy of the position measurements. The sensors may perform phase measurements on both the initiator's (e.g., the main ranging device in the car or the main hub) and the reflector's (e.g., key) CT. At the end of the multiple CT exchanges, the initiator and the reflector may exchange their phase measurement results to estimate the range and position of the key. PEPS applications require the ranging and positioning measurements to be secure against intruders such as main-in-the middle, phase manipulation, phase roll-over, and symbol level attacks. It is desired to reduce the cost and complexity of multi-carrier phase-based ranging techniques while improving accuracy and security.

PEPS applications using phase-based ranging solutions require the ranging and positioning measurements to be secure against phase roll-over and spoofing attacks such as main-in-the middle, phase manipulation, and symbol level attacks. To protect the phase-based ranging solutions using CT against the roll-over and phase manipulation attacks, the round-trip time (RTT) between the initiator and reflector devices may be measured by exchanging packets. Thus, the distance between the two devices may be measured using both phase-based ranging and RTT techniques. As long as the difference in the estimated distance between the two measurements is less than a threshold (e.g., 3 meters), the phase-based ranging result may be deemed secure. Multiple sensors (e.g., four sensors) may be used to improve the accuracy of the range and position estimates. For example, in car-key positioning, the sensors may be installed around the car to perform phase measurements on both the initiator's (e.g., the main ranging device in the car or the main hub) and the reflector's (e.g., key) CT.

One shortcoming of the RTT technique is that it is not immune against symbol level attacks such as Early Detect Late Commit (EDLC) or Late Commit Early Detect (LCED) attacks. One solution to protect the RTT technique against symbol level attacks is to use adjacent signal transmission, in which one or two adjacent signals with the same amplitude but one or two channels apart (e.g., ±2 MHz when transmitting with BLE 1M or ±4 MHz when transmitting with BLE 2M) are simultaneously transmitted with the main signal carried on the carrier frequency. The adjacent signals may protect the main signal by disrupting an attacker's broad-band analysis of the main signal such as by forcing it to use narrow-band filtering of the main signal. The multiple sensors used to improve the phase measurements may also perform time-difference-of-arrival (TDoA) estimates on both the initiator's and reflector's RTT packets to improve the RTT measurements. However, using separate adjacent signal transmitters and multiple sensors increases the cost and complexity of the phase-based PEPS solution.

Described herein are various aspects of techniques to share the sensing and adjacent signal transmitting functionalities on the same hardware platform, such as a supporting chipset of the main hub, and to time-multiplexing between the two functionalities for PEPS applications using multi-carrier phase-based ranging solutions. As a result, the total number of chipsets and the total cost is decreased. In a car-key application using multi-carrier phase-based ranging, aspects of the disclosure allow the main hub in the car to act as the main ranging device and one or more supporting chipsets installed around the car to be configured either as a sensor for phase measurement in phase-ranging mode or as an adjacent signal transmitter in RTT mode.

In one aspect, when there are multiple sensors (e.g., 4), a subset of the sensors (e.g., 2) may be randomly selected to play the role of the adjacent signal transmitters, increasing security due to spatial randomization. Configuring a subset of the sensors as the multi-location adjacent signal transmitters with different frequency offsets (e.g., ±2 MHz or ±4 MHz) protect the RTT packets and provide additional security (spatial) against symbol level attacks such as EDLC. In addition, for multiple sensors located within a small radius such as in a car, any phase roll-over attack happens in the same place. Because the main functionality of the sensors may be to sense the phase measurements rather than for RTT sensing, using the main hub supported by only a subset of the sensors for RTT sensing, while configuring the other sensors as adjacent signal transmitters, may be sufficient to detect the roll-over attack in the RTT mode without compromising the accuracy of the ranging estimates.

FIG. 1 is a block diagram that illustrates an application of secure phase-based ranging for car-key positioning, in which the functionalities for sensing and adjacent signal transmission are shared in the same chipset, in accordance with one aspect of the present disclosure.

The car has five BLE chipsets located on the car to implement the secure phase-based ranging solution. A hub designated BLE chipset 0 is the main ranging device and may be an initiator of a ranging request to the key or may be a reflector that responds to a ranging request from the key. Conversely, the key may be a reflector that responds to the hub's ranging request or may be an initiator of a ranging request to the hub. Four BLE chipsets designated BLE chipset 1-4 are distributed around the car to support the main hub. Each of BLE chipsets 1-4 supports the dual functionalities for sensing and adjacent signal transmission. The dual functionalities of one or more of BLE chipsets 1-4 may be time-multiplexed for sensing during the phase-based ranging and adjacent signal transmission during the RTT packet exchanges. Thus, during phase-based ranging, all of BLE chipsets 1-4 may be configured as sensors to perform the primary function of sensing the phase measurements. During RTT packet exchange, some of the BLE chipsets 1-4 (e.g., 2) may be configured as adjacent signal transmitters to transmit RTT packets on channels apart (e.g., ±2 MHz or ±4 MHz) from the main carrier of the RTT packet transmitted by the hub to protect against EDLC attacks, while the other BLE chipsets 1-4 remain as sensors to perform time-difference-of-arrival (TDoA) estimates on the RTT packets from the hub and the key. In one aspect, the adjacent channel may differ from the main carrier or the main channel by other values between ±2-4 MHz. In one aspect, some of the BLE chipsets 1-4 (e.g., 2) may be configured as adjacent CT transmitters to protect the desired main CT against roll-over and phase-manipulation attacks during phase-based ranging.

In one aspect, the roles that BLE chipsets 1-4 play during phase-based ranging and RTT packet exchanges may be configured by the hub. In one aspect, the hub may randomly and dynamically change the role each supporting chipset plays over time to increase security due to spatial randomization. The relative positions between the hub and BLE chipsets 1-4 are known. This information may be used along with the phase measurements made by the BLE chipsets 1-4 during phase ranging or TDoA measurements during RTT packet exchange to improve the range and position estimates. In one aspect, a host controller of the secure phase-based ranging system or an application may configure any of BLE chipsets 0-4 as the hub or the supporting chipset to add an extra dimension of randomization to the roles of the BLE chipsets 0-4 to further increase security.

FIG. 1 shows a configuration in which BLE chipset 1 and 3 are configured as adjacent signal transmitters during RTT packet exchange and sensors during phase-based ranging. The hub may transmit a RTT packet 111 on a main carrier during RTT packet exchange. BLE chipset 1 may transmit a RTT packet 121 on an adjacent channel of the main carrier and BLE chipset 3 may transmit a RTT packet 131 on the same or a different adjacent channel of the main carrier. The RTT packet returned from the key may be received by the hub for RTT measurements. During phase-based ranging, BLE chipsets 1 and 3 are configured as sensors. The CT returned from the key may be received by the hub as signal 113, by BLE chipset 1 as signal 123, and by BLE chipset 3 as signal 133 for phase measurements. BLE chipset 2 and 4 are configured as sensors to receive the RTT packet during RTT packet exchange and the CT during phase-based ranging.

Figure 2:
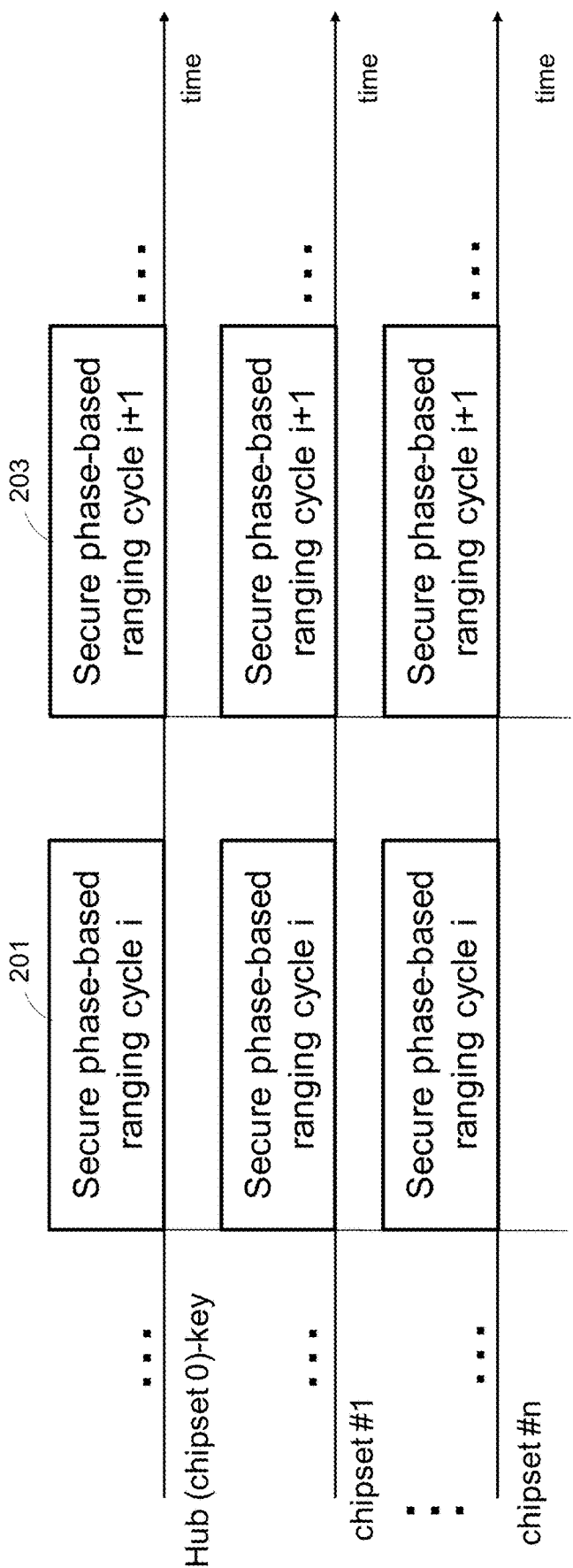
FIG. 2 illustrates multiple cycles of secure phase-based ranging for car-key positioning from the main hub and the synchronized supporting chipsets that share sensing and adjacent signal transmission functionalities, in accordance with one aspect of the present disclosure.

FIG. 2 illustrates multiple cycles of secure phase-based ranging (e.g., ranging cycle i designated as 201 and ranging cycle i+1 designated as 203) for car-key positioning from the main hub and the synchronized supporting chipsets that share sensing and adjacent signal transmission functionalities, in accordance with one aspect of the present disclosure. During each cycle (e.g., cycles 201 or 203), two desired devices, the initiator and the reflector, may exchange multiple CTs and RTT packets to perform the phase-based ranging and the RTT measurements to estimate the distance between the devices. The initiator may be the hub (chipset 0) in the car and the reflector may be the key, or vice versa. The cycles may be periodic or may be aperiodic.

The supporting chipsets, labeled as chipset 1 to chipset n, support the dual functionalities for sensing and adjacent signal transmission. The supporting chipsets are synchronized in time with the hub and the key so the timing for sensing and adjacent signal transmissions is synchronized with the CT and RTT exchanges between the hub and the key. Each cycle (e.g., cycles 201 or 203) may be divided into multiple timeslots. At the beginning of each cycle, in a calibration-synchronization timeslot, the hub, the key, and the supporting chipsets synchronize their timing and measure their frequency error offsets. In the discussion that follows, the hub, the key, and the supporting chipsets may be collectively referred to devices.

After the devices are time synchronized and the frequency error offsets measured, the hub and the key may be scheduled to perform the CT and RTT exchanges in subsequent timeslots in the cycle. At the beginning of each timeslot, the devices may switch to a new channel that will be used by the hub and the key for performing the CT and/or RTT exchanges in the timeslot. In one aspect, a host controller of the hub or an application in the car may perform the scheduling of the timeslots and channels of the cycles for the devices.

During each scheduled timeslot for CT and RTT exchanges, the hub and the key may exchange only CT, only RTT packets, or a combination of CT and RTT packets. During a timeslot for exchanging only CT, a supporting chipset may receive CT to make phase measurements if configured as a sensor or may transmit CT on an adjacent channel if configured as an adjacent signal transmitter. During a timeslot for exchanging only RTT packets, a supporting chipset may receive RTT packets to make TDoA measurements if configured as a sensor or may transmit RTT packets on an adjacent channel if configured as an adjacent signal transmitter. During a timeslot for exchanging a combination of CT and RTT packets, a supporting chipset may receive CT to make phase measurements and RTT packets to make TDoA measurements if configured as a sensor, or may transmit RTT packets and optionally CT on an adjacent channel if configured as an adjacent signal transmitter. The different types of timeslots will be discussed further.

Figure 3:
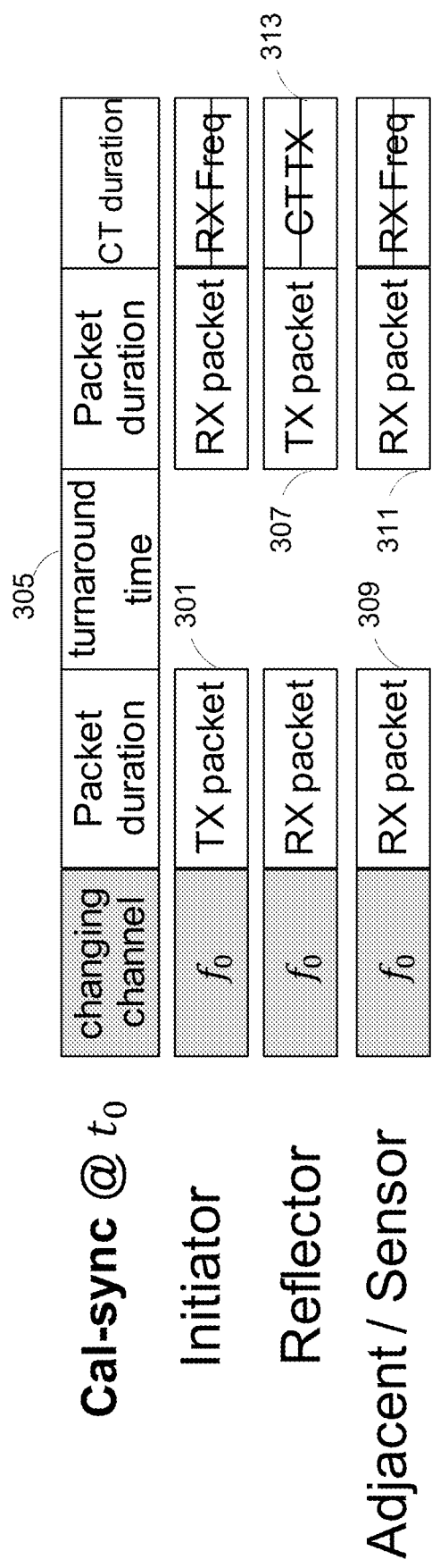
FIG. 3 illustrates the states in a calibration-synchronization timeslot of a secure phase-based ranging cycle for the chipset that shares sensing and adjacent signal transmission functionalities, in accordance with one aspect of the present disclosure.

FIG. 3 illustrates the states in a calibration-synchronization timeslot of a secure phase-based ranging cycle for the chipset that shares sensing and adjacent signal transmission functionalities, in accordance with one aspect of the present disclosure. At the beginning of the cycle at timeslot to, the initiator and the reflector synchronize their timing references when the initiator first sends a packet 301, and after the turnaround time (Tx-to-Rx for the initiator and Rx-to-Tx for the reflector) 305, the reflector sends back a packet 307. The supporting chipset with the sensor/adjacent signal transmitter may be configured to receive the packets 301 and 307 as received packets 309 and 311 from the initiator and the reflector, respectively, to synchronize its timing reference with the initiator-reflector packet exchange. Following timing reference synchronization among the devices, the reflector transmits a CT 313 for the initiator and the supporting chipset to measure their frequency error offsets.

Figure 4A:
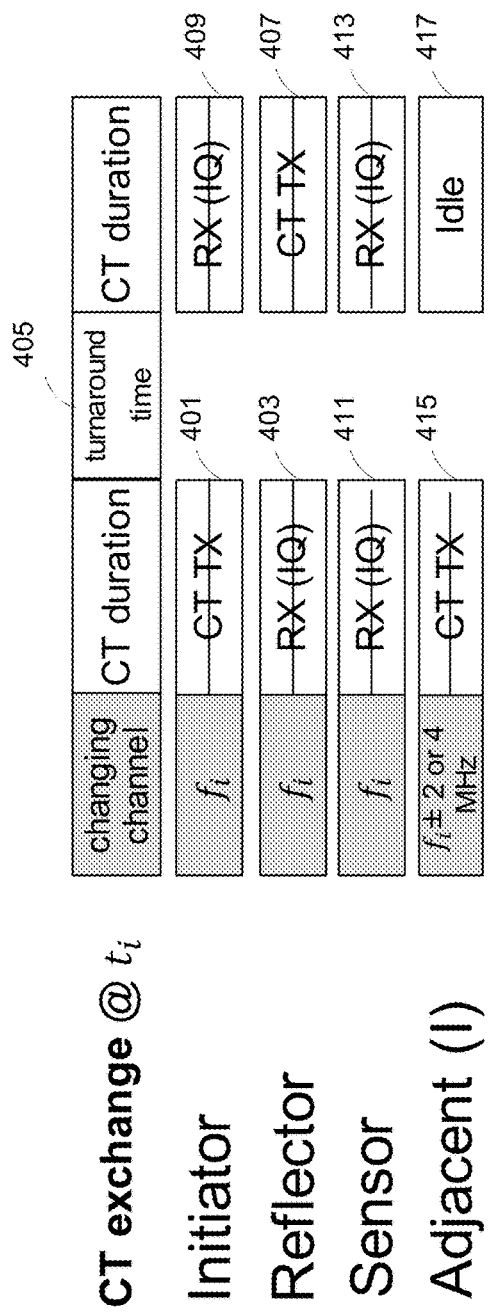
FIG. 4A illustrates the states in a CT exchange timeslot of a secure phase-based ranging cycle in which the main hub acts as the initiator, the key acts as the reflector, and the supporting chipsets may act as a sensor or an adjacent signal transmitter, in accordance with one aspect of the present disclosure.

FIG. 4A illustrates the states in a CT exchange timeslot of a secure phase-based ranging cycle in which the main hub acts as the initiator, the key acts as the reflector, and the supporting chipsets may act as a sensor or an adjacent signal transmitter, in accordance with one aspect of the present disclosure.

In a timeslot $t_i>0$ (after the calibration-synchronization timeslot), the initiator and the reflector may be scheduled to exchange only CT. The main hub as the initiator transmits a CT 401, which is a continuous wave carrier signal, toward the reflector. The key as the reflector receives the CT 401 and locks its local oscillator to the received CT 403 to perform the phase measurement. After the turnaround time 405, the reflector transmits a CT 407 back to the initiator. The initiator receives the reflector's CT 407 as received CT signal 409 to perform the phase measurement. A supporting chipset with the dual functionality may be configured by an application or a host controller of the secure phase-based ranging system to act as a sensor during the CT exchange timeslot. The supporting chipset may receive the CT signals 401 and 407 as received CT signals 411 and 413 to perform phase measurements during both the initiator's and reflector's CT transmissions, respectively.

Alternatively, a supporting chipset may be configured to act as an adjacent signal transmitter to transmit a CT signal 415 on an adjacent channel (e.g., ±2 MHz or ±4 MHz offset from the carrier frequency) of the initiator's CT 401 during the duration of the initiator's CT transmission when the main hub of the car is the initiator. The adjacent CT transmission 415 can protect the desired main CT of the main hub against roll-over and phase-manipulation attacks during phase-based ranging. After the turnaround time 405, during the reflector's CT transmission, the adjacent signal transmitter may be idle 417 to avoid interfering with the phase measurements performed by the initiator on the reflector's CT signal 407. In one aspect, a preferred configuration of the supporting chipset during phase measurements is as a sensor rather than as an adjacent signal transmitter so as to increase the number of sensors to improve the accuracy of the key's range estimates.

Figure 4B:
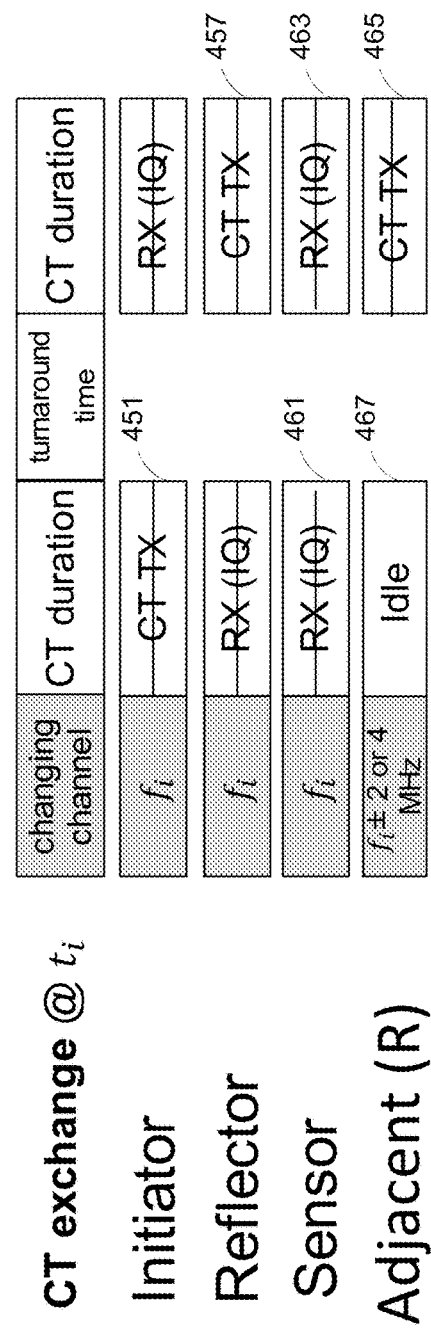
FIG. 4B illustrates the states in a CT exchange timeslot of a secure phase-based ranging cycle in which the main hub acts as the reflector, the key acts as the initiator, and the supporting chipsets may act as a sensor or an adjacent signal transmitter, in accordance with one aspect of the present disclosure.

FIG. 4B illustrates the states in a CT exchange timeslot of a secure phase-based ranging cycle in which the main hub acts as the reflector, the key acts as the initiator, and the supporting chipsets may act as a sensor or an adjacent signal transmitter, in accordance with one aspect of the present disclosure. In FIG. 4B, the role of the initiator and reflector between the main hub and key is reversed from that in FIG. 4A.

The key as the initiator and the main hub as the reflector exchange CT signals 451 and 457 to perform phase measurement. A supporting chipset configured as a sensor may receive the CT signals 451 and 457 as received CT signals 461 and 463 to perform phase measurements during both the initiator's and reflector's CT transmissions, respectively, as in FIG. 4A. A supporting chipset configured as an adjacent signal transmitter is idle 467 during the initiator's CT transmission to avoid interfering with the phase measurements performed by the reflector on the initiator's CT signal 451. During the reflector's CT transmission 457, the adjacent channel transmitter transmits a CT signal 465 on an adjacent channel of the reflector's CT 457 to protect the desired main CT of the main hub against roll-over and phase-manipulation attacks.

Figure 5A:
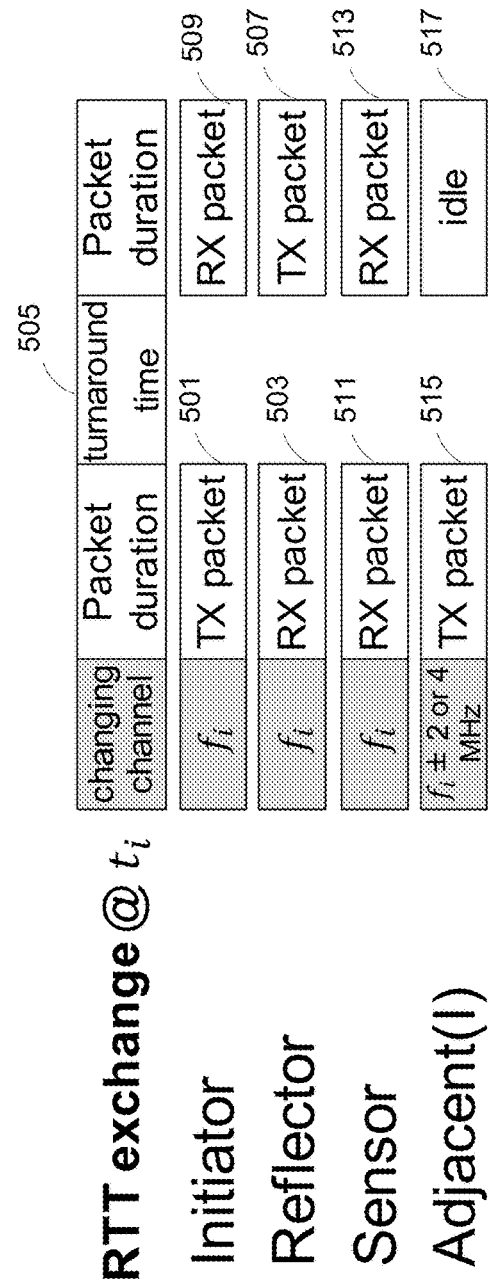
FIG. 5A illustrates the states in a RTT packet exchange timeslot of a secure phase-based ranging cycle in which the main hub acts as the initiator, the key acts as the reflector, and the supporting chipsets may act as a sensor or an adjacent signal transmitter, in accordance with one aspect of the present disclosure.

FIG. 5A illustrates the states in a RTT packet exchange timeslot of a secure phase-based ranging cycle in which the main hub acts as the initiator, the key acts as the reflector, and the supporting chipsets may act as a sensor or an adjacent signal transmitter, in accordance with one aspect of the present disclosure.

In a timeslot $t_i$>0 (after the calibration-synchronization timeslot), the initiator and the reflector may be scheduled to exchange only RTT packets. The initiator and the reflector may exchange RTT packets to measure the distance between the initiator and reflector based the time of arrival (ToA) and the time of departure (ToD) measurements of the RTT packets. The main hub as the initiator transmits a RTT packet 501, which may be a modulated packet with an access address at the beginning, toward the reflector. The key as the reflector receives the RTT packet 501 as received RTT packet 503 and estimates the ToA. After the turnaround time 505, the reflector transmits a new RTT packet 507 back to the initiator and estimates the time of departure ToD. The initiator receives the reflector's RTT packet 507 as received RTT packet 509 and estimates the ToA.

A supporting chipset may be configured to act as an adjacent signal transmitter to transmit the RTT packet 515 on an adjacent channel (e.g., ±2 MHz or ±4 MHz) of the initiator's RTT packet 501 during the duration of the initiator's RTT packet transmission when the main hub of the car is the initiator. The adjacent signal transmission of the RTT packet 515 can protect the main hub's RTT packet 501 against EDLC attacks during the RTT mode. After the turnaround time 505, during the reflector's RTT packet transmission 507, the adjacent signal transmitter may be idle 517 to avoid interfering with the ToA estimates performed by the initiator on the reflector's RTT packet 507.

Alternatively, a supporting chipset may be configured to act as a sensor during the RTT exchange timeslot. The supporting chipset may receive the RTT packets 501 and 507 as received RTT packets 511 and 513 to estimate TDoA during both the initiator's and reflector's RTT packet transmissions, respectively. In one aspect, a preferred configuration of the supporting chipset during the RTT mode is as an adjacent signal transmitter rather than as a sensor to protect against EDLC attacks.

Figure 5B:
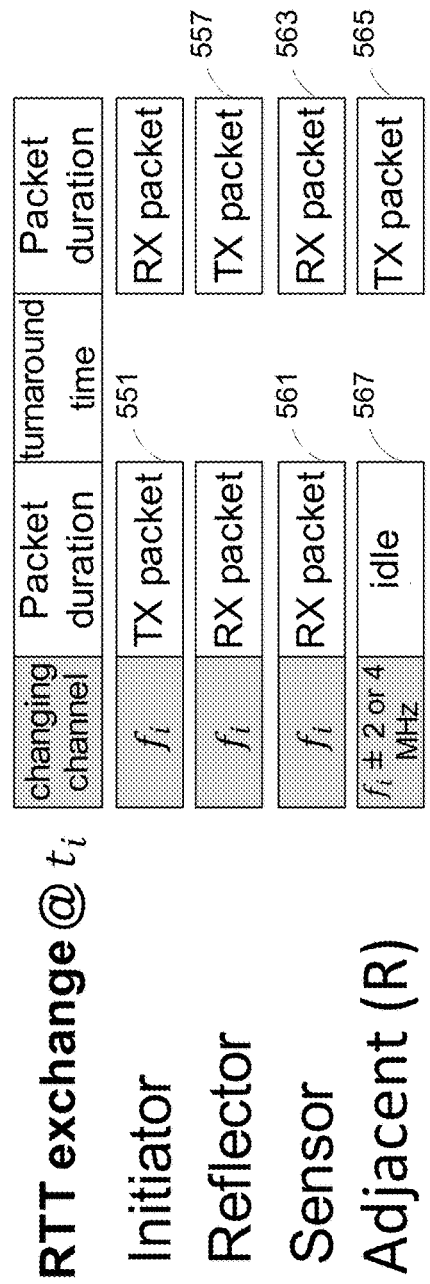
FIG. 5B illustrates the states in a RTT packet exchange timeslot of a secure phase-based ranging cycle in which the main hub acts as the reflector, the key acts as the initiator, and the supporting chipsets may act as a sensor or an adjacent signal transmitter, in accordance with one aspect of the present disclosure.

FIG. 5B illustrates the states in a RTT packet exchange timeslot of a secure phase-based ranging cycle in which the main hub acts as the reflector, the key acts as the initiator, and the supporting chipsets may act as a sensor or an adjacent signal transmitter, in accordance with one aspect of the present disclosure. In FIG. 5B, the role of the initiator and reflector between the main hub and key is reversed from that in FIG. 5A.

The key as the initiator and the main hub as the reflector exchange RTT packets 551 and 557 to estimate the RTT by measuring ToA and ToD of the RTT packets. A supporting chipset configured as an adjacent signal transmitter is idle 567 during the initiator's RTT packet transmission to avoid interfering with the ToA estimates performed by the reflector on the initiator's RTT packet 551. During the reflector's RTT packet transmission, the adjacent channel transmitter transmits RTT packet 565 on an adjacent channel of the reflector's RTT packet 557 to protect the main hub's RTT packet against EDLC attacks. A supporting chipset configured as a sensor may receive the RTT packets 551 and 557 as received RTT packets 561 and 563 to estimate TDoA during both the initiator's and reflector's RTT packet transmissions, respectively, as in FIG. 5A.

FIG. 6A illustrates the states in a hybrid timeslot of a secure phase-based ranging cycle in which the main hub acts as the initiator, the key acts as the reflector, and the supporting chipsets may act as a sensor or an adjacent signal transmitter, in accordance with one aspect of the present disclosure.

In a timeslot $t_i$>0 (after the calibration-synchronization timeslot), the initiator and the reflector may be scheduled to exchange CTs together with RTT packets in a timeslot that may also be referred as a hybrid CT-RTT packet exchange timeslot. The main hub as the initiator transmits a RTT packet 601 and a CT signal 602 toward the reflector. The key as the reflector receives the RTT packet 601 as received RTT packet 603 and estimates the time of arrival (ToA). The reflector also receives the CT signal 602 and locks its local oscillator to the received CT 604 to perform the phase measurement. After the turnaround time 605, the reflector transmits a new CT 607 and a new RTT packet 608 back to the initiator. The initiator receives the reflector's CT 607 and RTT packet 608 as received CT signal 609 and receive RTT packet 610, and performs the phase measurement and estimates the ToA, respectively.

A supporting chipset may be configured to act as an adjacent signal transmitter to transmit the RTT packet 615 on an adjacent channel (e.g., ±2 MHz or ±4 MHz) of the initiator's RTT packet 601 during the duration of the initiator's RTT packet transmission when the main hub is the initiator to protect the main hub's RTT packet 601 against EDLC attacks. In one aspect, the adjacent signal transmitter may transmit a CT signal 616 on an adjacent channel of the initiator's CT 602 during the initiator's CT transmission to protect the desired main CT of the main hub against rollover and phase-manipulation attacks. In one aspect, the adjacent signal transmitter may be idle during the initiator's CT transmission. The adjacent signal transmitter may also be idle 617 during the reflector's CT and RTT packet transmissions to avoid interfering with the phase measurements performed by the initiator on the reflector's CT signal 607 and the ToA estimates performed by the initiator on the reflector's RTT packet 608.

Alternatively, a supporting chipset may be configured to act as a sensor during the RTT packet exchange and CT exchange. The supporting chipset may receive the RTT packets 601 and 608 as received RTT packets 611 and 613 to estimate TDoA during both the initiator's and reflector's RTT packet transmissions, respectively. The supporting chipset may also receive the CT signals 602 and 607 as received CT signals 612 and 614 to perform phase measurements during both the initiator's and reflector's CT transmissions, respectively.

FIG. 6B illustrates the states in a hybrid timeslot of a secure phase-based ranging cycle in which the main hub acts as the reflector, the key acts as the initiator, and the supporting chipsets may act as a sensor or an adjacent signal transmitter, in accordance with one aspect of the present disclosure. In FIG. 6B, the role of the initiator and reflector between the main hub and key is reversed from that in FIG. 6A.

The key as the initiator and the main hub as the reflector exchange RTT packets 651 and 658 to estimate the RTT using the ToA-ToD of the RTT packets and exchange CT signals 652 and 657 to perform phase measurements of the CT signals. A supporting chipset configured as an adjacent signal transmitter is idle 667 during the initiator's RTT packet and CT transmissions to avoid interfering with the phase measurements performed by the reflector on the initiator's CT signal 652 and the ToA estimates performed by the reflector on the initiator's RTT packet 651. During the reflector's CT transmission, the adjacent signal transmitter may transmit a CT signal 665 on an adjacent channel of the reflector's CT 657 to protect the desired main CT of the main hub against roll-over and phase-manipulation attacks. In one aspect, the adjacent signal transmitter may be idle during the reflector's CT transmission. During the reflector's RTT packet transmission, the adjacent channel transmitter transmits the RTT packet 666 on an adjacent channel of the reflector's RTT packet 658 to protect the main hub's RTT packet against EDLC attacks. Alternatively, a supporting chipset configured as a sensor may receive the RTT packets 651 and 658 as received RTT packets 661 and 663 to estimate TDoA during both the initiator's and reflector's RTT packet transmissions, respectively, and may receive the CT signals 652 and 657 as received CT signals 662 and 664 to perform phase measurements during both the initiator's and reflector's CT transmissions, respectively, as in FIG. 6A.

Figure 7:
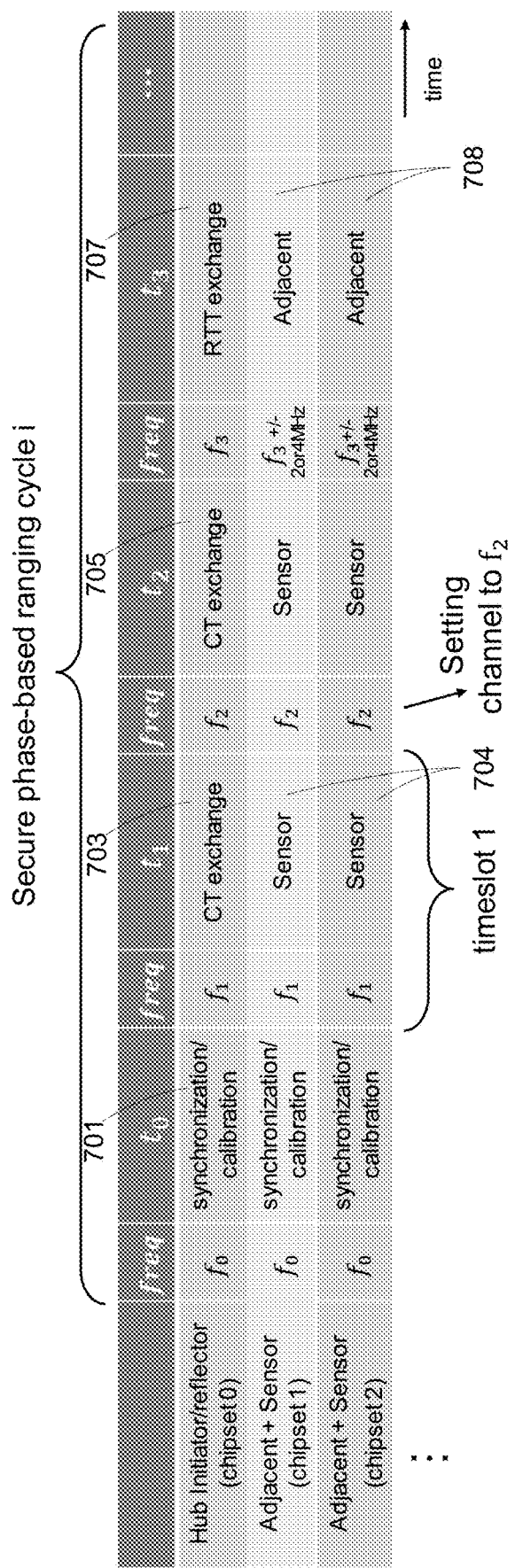
FIG. 7 illustrates a first example of a combination of various timeslot types in a secure phase-based ranging cycle for the main hub and the synchronized supporting chipsets that share sensing and adjacent signal transmission functionalities, in accordance with one aspect of the present disclosure.

FIG. 7 illustrates a first example of a combination of various timeslot types in a secure phase-based ranging cycle for the main hub and the synchronized supporting chipsets that share sensing and adjacent signal transmission functionalities, in accordance with one aspect of the present disclosure. At the beginning of the cycle at timeslot to during the synchronization-calibration timeslot 701, the initiator and the reflector set their frequency channels to $f_0$, which is the known or agreed channel for the initiator and reflector to perform calibration and synchronization. The supporting chipsets with the sensor/adjacent signal transmitter also set their frequency to $f_0$ to perform calibration and synchronization based on the initiator-reflector RTT packet exchange and CT transmission. For example, the supporting chipsets receive the RTT packets from the initiator and the reflector to synchronize their timing references and receive the CT transmission from the reflector to measure their frequency error offsets.

After the synchronization-calibration timeslot 701, the next three timeslots are scheduled as CT exchange 703, CT exchange 705, and RTT packet exchange timeslots 707. At timeslots $t_1$ and $t_2$ (i.e., CT exchange timeslots 703 and 705), the supporting chipsets 1 and 2 set their channels to the same channels as the initiator and reflector (i.e., $f_1$ and $f_2$, respectively) because they are configured to act as sensors 704 during the CT exchange timeslots 703 and 705 to receive the CT transmissions from the initiator and reflector to perform phase measurements. At timeslot $t_3$ (i.e., RTT packet exchange timeslot 707), the supporting chipsets 1 and 2 set their channels to the adjacent channel of the initiator and reflector ($f_3$±2 MHz or ±4 MHz) because they are configured to act as adjacent signal transmitters 708 to transmit RTT packets during the RTT packet exchange timeslot 707 to protect the initiator's or the reflector's RTT packet against EDLC attacks.

Figure 8:
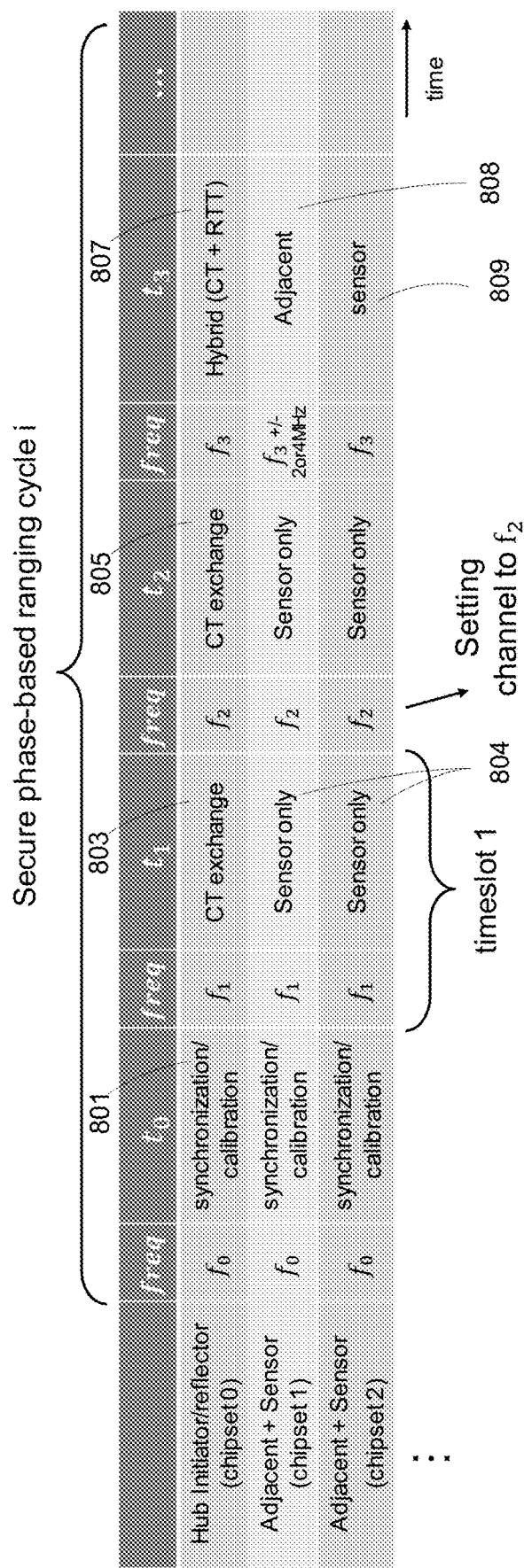
FIG. 8 illustrates a second example of a combination of various timeslot types in a secure phase-based ranging cycle for the main hub and the synchronized supporting chipsets that share sensing and adjacent signal transmission functionalities, in accordance with one aspect of the present disclosure.

FIG. 8 illustrates a second example of a combination of various timeslot types in a secure phase-based ranging cycle for the main hub and the synchronized supporting chipsets that share sensing and adjacent signal transmission functionalities, in accordance with one aspect of the present disclosure. The first four timeslots are scheduled as synchronization-calibration 801, CT exchange 803, CT exchange 805, and hybrid CT-RTT packet exchange timeslots 807. The synchronization-calibration timeslot 801 is the same as described for FIG. 7.

At timeslots $t_1$ and $t_2$ (i.e., CT exchange timeslots 803 and 805), the supporting chipsets 1 and 2 set their channels to the same channels as the initiator and reflector (i.e., $f_1$ and $f_2$, respectively) because they are configured to act as sensors 804 during the CT exchange timeslots 803 and 805 to receive the CT transmissions from the initiator and reflector to perform phase measurements. At timeslot $t_3$ (i.e., hybrid CT-RTT packet exchange timeslot 807), supporting chipsets 1 sets its channel to the adjacent channel ($f_3$±2 MHz or ±4 MHz) because it is configured to act as an adjacent signal transmitter 808 to transmit the RTT packet during the RTT portion of the hybrid CT-RTT packet exchange timeslot 807 to protect the main hub's RTT packet against EDLC attacks. In one aspect, supporting chipset 1 may transmit a CT signal on the adjacent channel during the main hub's CT transmission during the CT portion of the hybrid CT-RTT packet exchange timeslot 807 to protect the desired main CT of the main hub against roll-over and phase-manipulation attacks.

At timeslot $t_3$, supporting chipsets 2 set its channel to $f_3$ because it remains configured to act as a sensor 809 during the hybrid CT-RTT packet exchange timeslot 807. Supporting chipset 2 may receive the initiator's and reflector's RTT packet transmissions to estimate TDoA and may receive the initiator's and reflector's CT transmissions to perform phase measurements.

Figure 9:
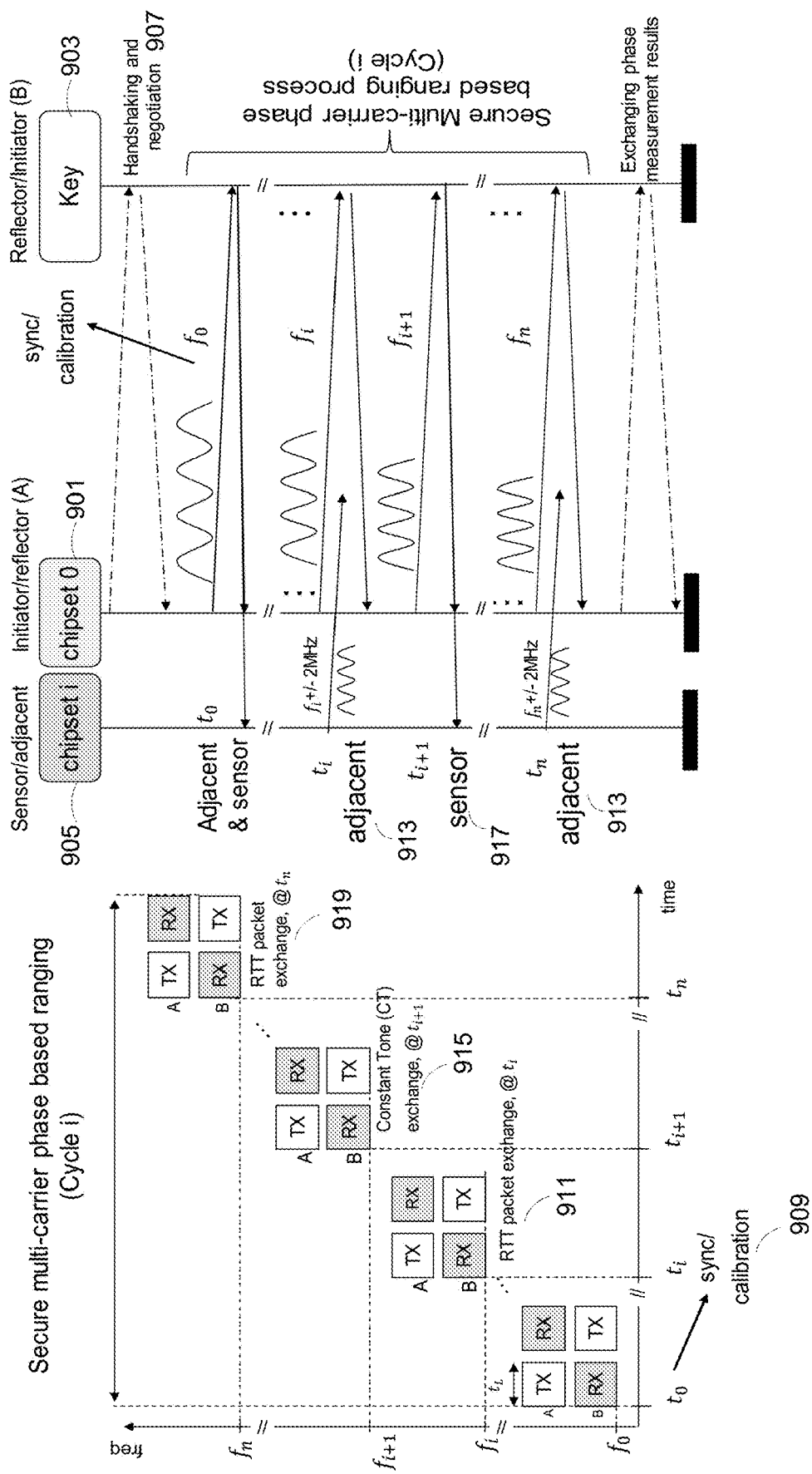
FIG. 9 illustrates a message sequence diagram of one cycle of secure multi-carrier phase-based ranging between the main hub and the key with the support of the chipsets that share sensing and adjacent signal transmission functionalities, in accordance with one aspect of the present disclosure.

FIG. 9 illustrates a message sequence diagram of one cycle of secure multi-carrier phase-based ranging between the main hub and the key with the support of the chipsets that share sensing and adjacent signal transmission functionalities, in accordance with one aspect of the present disclosure.

Before the cycle, the initiator 901 and reflector 903 perform a handshaking and negotiation procedure 907, by which they agree on the ranging parameters such as the channels for the timeslots of the cycle and the start time of the cycle and/or timeslots. A host controller may collect the parameters from the initiator 901 and may forward them to the supporting chipsets 905. The host controller may also schedule the type of timeslots and configure the role of each supporting chipset 905 as either a sensor or an adjacent signal transmitter for each timeslot.

At the synchronization-calibration timeslot 909 starting at to, the initiator 901, reflector 903, and the supporting chipsets 905 set their frequency channels to $f_0$ to synchronize their timing references and measure their frequency error offsets based on the initiator-reflector RTT packet exchange and CT transmission. At the RTT packet exchange timeslot 911 starting at the initiator 901 and reflector 903 set their frequency channels to $f_i$ to exchange RTT packets. The chipset i (905) acts as an adjacent signal transmitter 913 to transmit the RTT packet on an adjacent channel (e.g., $f_i \pm 2$ MHz). At the CT exchange timeslot 915 starting at $t_{i+1}$ the initiator 901 and reflector 903 set their frequency channels to $f_{i+1}$ to exchange CT signals. The chipset i (905) acts as a sensor 917 to receive the initiator's and the reflector's CT transmissions to perform phase measurements. At the RTT packet exchange timeslot 919 starting at to, the initiator 901 and reflector 903 set their frequency channels to $f_n$ to exchange RTT packets. The chipset i (905) acts as an adjacent signal transmitter 913 to transmit the RTT packet on an adjacent channel (e.g., $f_n \pm 2$ MHz). At the end of the cycle, the initiator 901 and reflector 903 may exchange phase measurement results. In one aspect, the host controller of the phase-based ranging system in the car may exchange phase measurement results with a host controller of the key. In one aspect, the chipset i (905) may transmit the phase measurements to the host controller of the phase-based ranging system.

Figure 10:
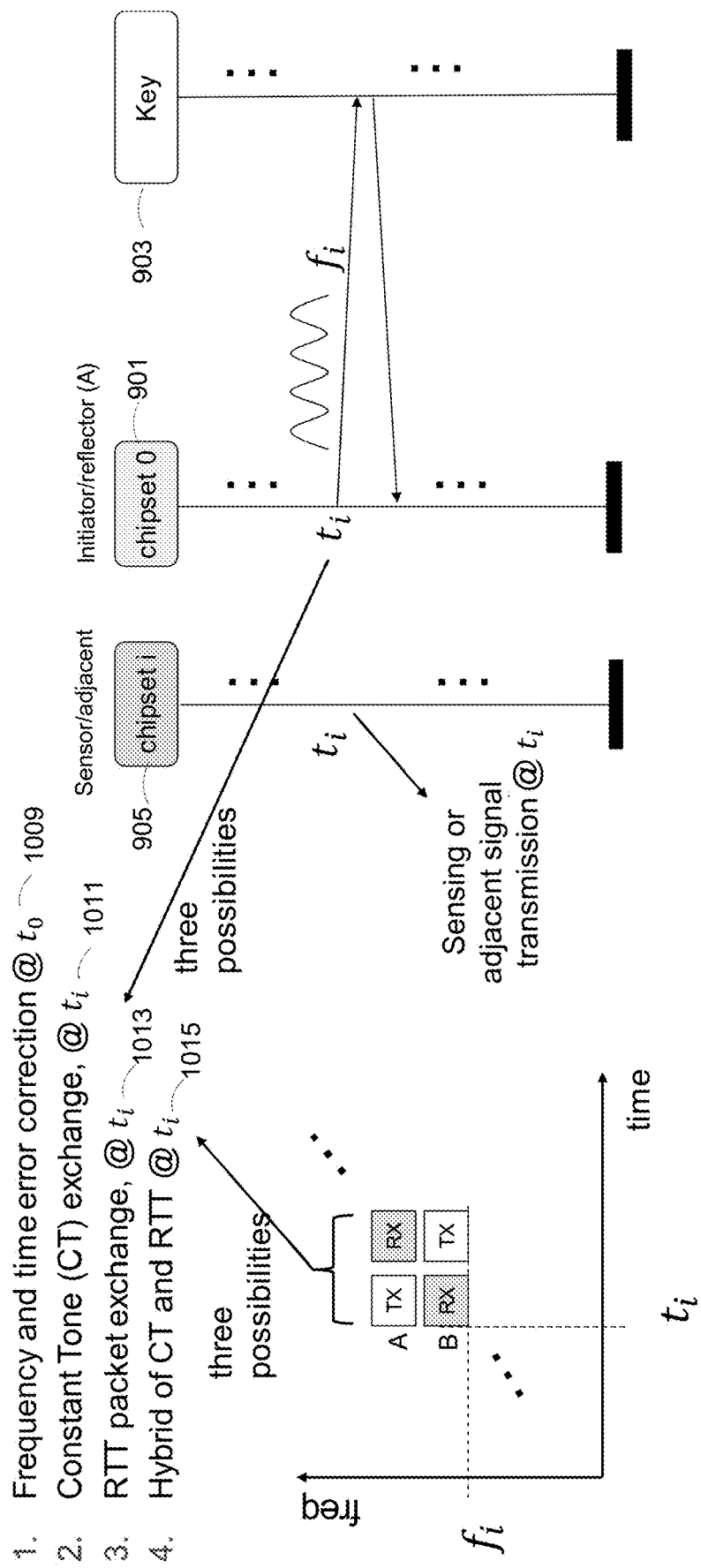
FIG. 10 illustrates the function of the timeslots in a secure phase-based ranging cycle for frequency and time error correction, and the exchange of CT, RTT packet, or hybrid CT and RTT between the main hub and the key with the support of the chipset that shares sensing and adjacent signal transmission functionalities, in accordance with one aspect of the present disclosure.

FIG. 10 illustrates the function of the timeslots in a secure phase-based ranging cycle for frequency and time error correction, and the exchange of CT, RTT packet, or hybrid CT and RTT between the main hub and the key with the support of the chipset that shares sensing and adjacent signal transmission functionalities, in accordance with one aspect of the present disclosure.

As in FIG. 9, at the synchronization-calibration timeslot 1009 starting at to, the initiator 901, reflector 903, and the supporting chipset i (905) set their frequency channels to a common frequency to synchronize their timing references and measure their frequency error offsets based on the initiator-reflector RTT packet exchange and CT transmission. At the timeslot starting at the timeslot may be scheduled for CT exchange 1011, RTT packet exchange 1013, or hybrid CT-RTT packet exchange 1015. The supporting chipset i may be configured as a sensor or an adjacent signal transmitter.

When configured as a sensor during a CT exchange timeslot 1011, the supporting chipset i (905) may receive the CT signals to perform phase measurements. When configured as an adjacent signal transmitter during the CT exchange timeslot 1011, the supporting chipset i (905) may transmit a CT signal on an adjacent channel during the initiator's or the reflector's CT transmission depending on the role of the main hub and key. When configured as a sensor during a RTT exchange timeslot 1013, the supporting chipset i (905) may receive the RTT packets to estimate TDoA of the packets. When configured as an adjacent signal transmitter during the RTT exchange timeslot 1013, the supporting chipset i (905) may transmit a RTT packet on an adjacent channel during the initiator's or the reflector's RTT packet transmission depending on the role of the main hub and key. When configured as a sensor during a hybrid CT-RTT packet exchange timeslot 1015, the supporting chipset i (905) may receive the RTT packets to estimate the TDoA and may receive the CT transmissions to perform the phase measurements. When configured as an adjacent signal transmitter during the hybrid CT-RTT packet exchange timeslot 1015, the supporting chipset i (905) may transmit a RTT packet on an adjacent channel during the initiator's or the reflector's RTT packet transmission depending on the role of the main hub and key. In one aspect, when configured as an adjacent signal transmitter during the hybrid CT-RTT packet exchange timeslot 1015, the supporting chipset i (905) may transmit a CT signal on an adjacent channel during the initiator's or the reflector's CT transmission depending on the role of the main hub and key.

Figure 11:
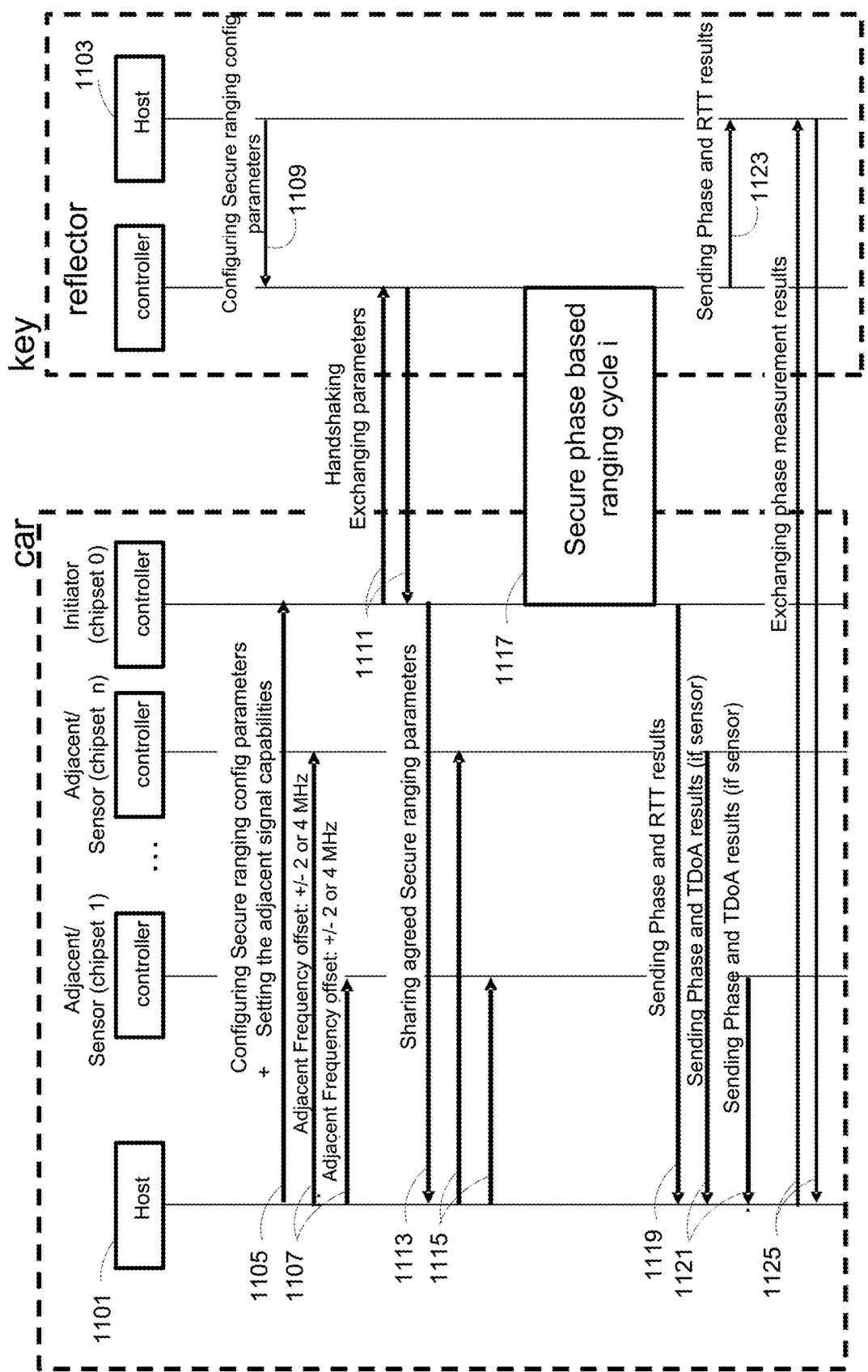
FIG. 11 illustrates a message sequence diagram between hosts of the car and the key, the main hub in the car as the initiator, the key as the reflector, and the supporting chipsets that share sensing and adjacent signal transmission functionalities to implement secure phase-based ranging cycles, in accordance with one aspect of the present disclosure.

FIG. 11 illustrates a message sequence diagram between hosts of the car and the key, the main hub in the car as the initiator, the key as the reflector, and the supporting chipsets that share sensing and adjacent signal transmission functionalities to implement secure phase-based ranging cycles, in accordance with one aspect of the present disclosure.

Before the secure phase-based ranging cycles, the host 1101 in the car may configure the initiator (chipset 0) and the supporting chipsets (chipsets 1-n) with an initial set of configuration parameters such as the cycles, timeslots, channels for the timeslots of the cycles, start times of the cycles/timeslots, etc., in operation 1105. The host 1101 may also configure the role of each supporting chipset as either a sensor or an adjacent signal transmitter for each timeslot of the cycles, and the frequency offset of the adjacent channel (±2 MHz or ±4 MHz) in operation 1107. A host 1103 of the reflector in the key may also configure the reflector with its respective set of parameters in operation 1109.

The initiator and the reflector may perform a handshaking and negotiation procedure to exchange their configuration parameters and security keys in operation 1111. The initiator and reflector may agree on a set of secure ranging parameters such as the channels for the timeslots of the cycles, start times of the cycles/timeslots, etc., that are tailored to the capabilities of the initiator and reflector. The host 1101 of the car may collect the agreed secure ranging parameters from the initiator in operation 1113 to forward to the supporting chipsets to synchronize the scheduled cycles/timeslots and the associated channels among the chipsets in operation 1115.

The initiator, reflector, and the supporting chipsets may then start the scheduled timeslots of the cycles to exchange multiple CTs and RTT packets over multiple channels and the supporting chipsets may follow their configured roles for the timeslots of the cycles to perform the secure phase based ranging cycles in operation 1117. At the end of a cycle, the initiator and the supporting chipsets that have been configured as a sensor during at least one timeslot of the cycle may send their phase measurements and ToD-ToA estimates (from the initiator) in operation 1119 or the TDoA estimates (from the supporting chipsets) to the host 1101 of the car in operation 1121. The reflector may send its phase measurements and ToD-ToA estimates to the host 1103 of the key in operation 1123. The host 1101 of the car and the host 1103 of the key may exchange their phase measurements and/or ToD-ToA estimates in operation 1125. For example, the phase measurements and/or the ToD-ToA estimates from the key may be used as correction terms by the host 1101 of the car. The host 1101 of the car may use the received phase measurements from the initiator, key, and the supporting chipsets, the ToD-ToA estimates from the initiator and the key, and the TDoA estimates from the supporting chipsets over multiple cycles to generate an accuracy estimate of the range and the position of the key.

Figure 12:
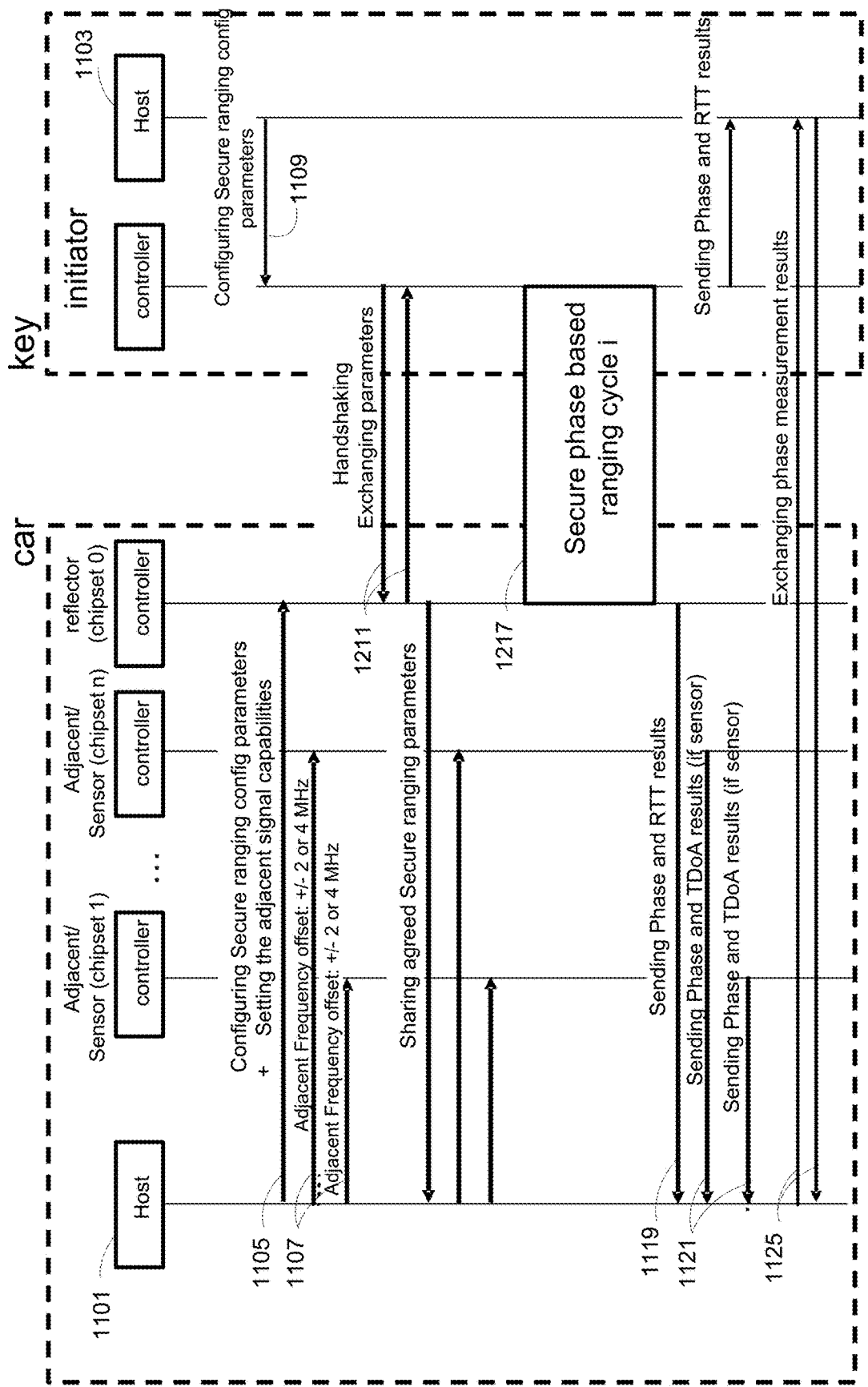
FIG. 12 illustrates a message sequence diagram between a host, the key as the initiator, the main hub in the car as the reflector, and the supporting chipsets that share sensing and adjacent signal transmission functionalities to implement secure phase-based ranging cycles, in accordance with one aspect of the present disclosure.

FIG. 12 illustrates a message sequence diagram between a host, the key as the initiator, the main hub in the car as the reflector, and the supporting chipsets that share sensing and adjacent signal transmission functionalities to implement secure phase-based ranging cycles, in accordance with one aspect of the present disclosure. In FIG. 12, the role of the initiator and reflector between the main hub and key is reversed from that in FIG. 11.

After the host 1101 of the car configures the reflector (chipset 0) and the supporting chipsets with the configuration parameters in operations 1105 and 1107, respectively, and the host 1103 of the initiator in the key configures the initiator with its configuration parameters in operation 1109, the initiator in the key initiates handshaking and negotiation with the reflector in the car to exchange their configuration parameters and to agree on a set of secure ranging parameters in operation 1211. The initiator in the key may then start the exchange of multiple CTs and RTT packets with the reflector and the supporting chipsets in their timeslot-configured roles in the car to perform the secure phase based ranging cycles in operation 1217. At the end of each cycle, the host 1101 of the car may receive the phase measurements and RTT results from the reflector in operation 1119, receive the phase measurements and TDoA estimates from the supporting chipsets in operation 1121, exchange its phase and/or RTT results with the host 1103 of the key in operation 1125, and generate an accuracy estimate of the range and the position of the key as in FIG. 11.

Figure 13:
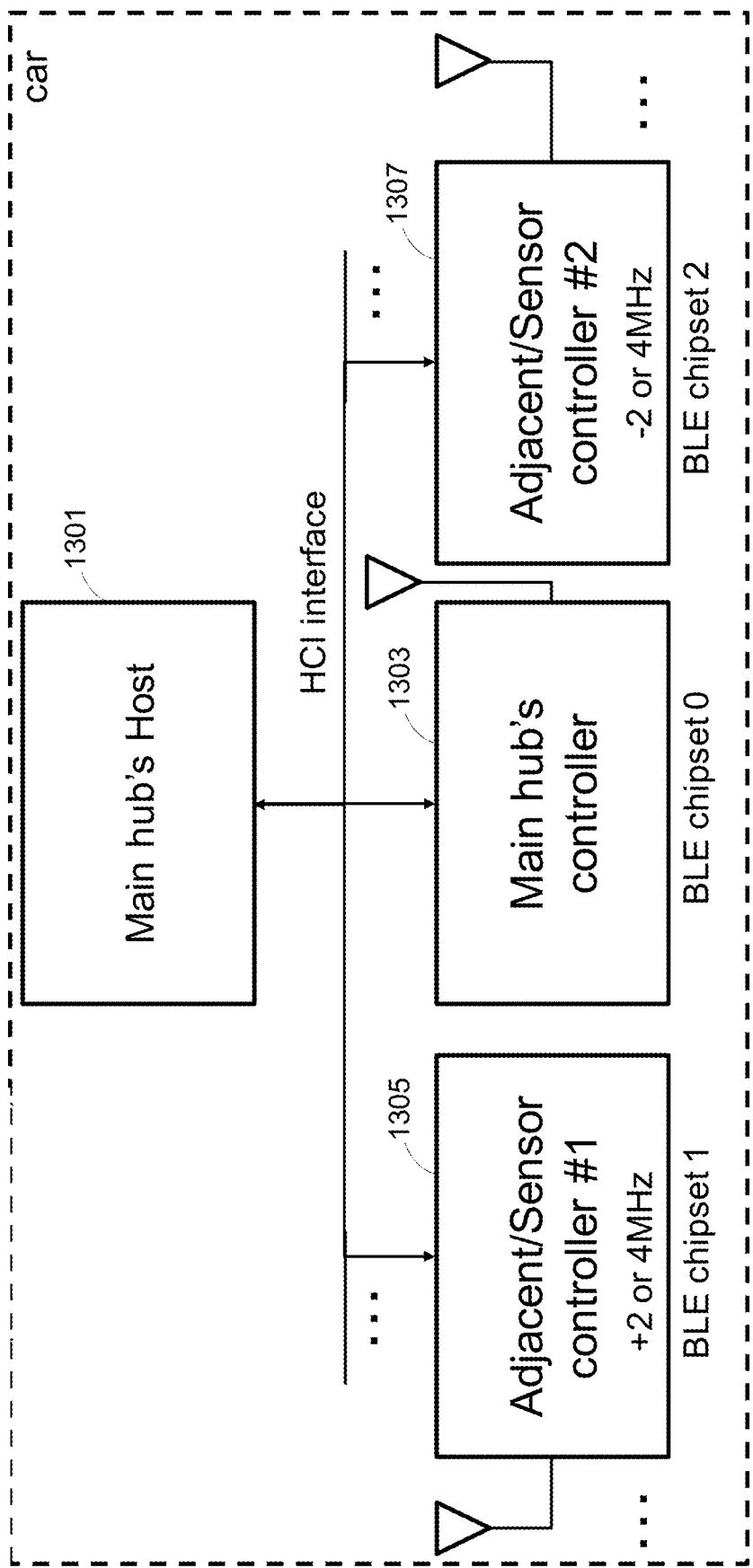
FIG. 13 illustrates a block diagram of the interface among the main hub's host, the main hub, and the supporting chipsets that share sensing and adjacent signal transmission functionalities to implement secure phase-based ranging cycles, in accordance with one aspect of the present disclosure.

FIG. 13 illustrates a block diagram of the interface among the main hub's host 1301, the main hub 1303, and the supporting chipsets 1305 and 1307 that share sensing and adjacent signal transmission functionalities to implement secure phase-based ranging cycles, in accordance with one aspect of the present disclosure.

The main hub's host 1301 communicates with the main hub 1303 of BLE chipset 0 and the supporting chipsets 1305, 1307 of BLE chipsets 1-2 containing the dual functionalities for sensing and adjacent signal transmission through a BLE host controller interface (HCI). BLE chipsets 0-2 (1303, 1305, 1307) may contain controllers to execute instructions to implement the secure multi-carrier phase-based ranging cycles discussed. The main hub's host 1301 may configure BLE chipsets 0-2 (1303, 1305, 1307) with configuration parameters and the roles of each supporting chipset as a sensor or an adjacent signal transmitter for the timeslots of the cycles. The main hub's host 1301 may also forward to the supporting chipsets 1305 and 1307 ranging parameters negotiated by the main hub 1303 with a key after the handshaking and negotiation procedure prior to start of the ranging cycles. At the end of the ranging cycles, the main hub's host 1301 may collect measurements results including the phase measurement, ToD-ToA, and TDoA estimates from BLE chipsets 0-2 (1303, 1305, 1307) and exchange measurement results with the key to estimate the range and position of the key.

Figure 14:
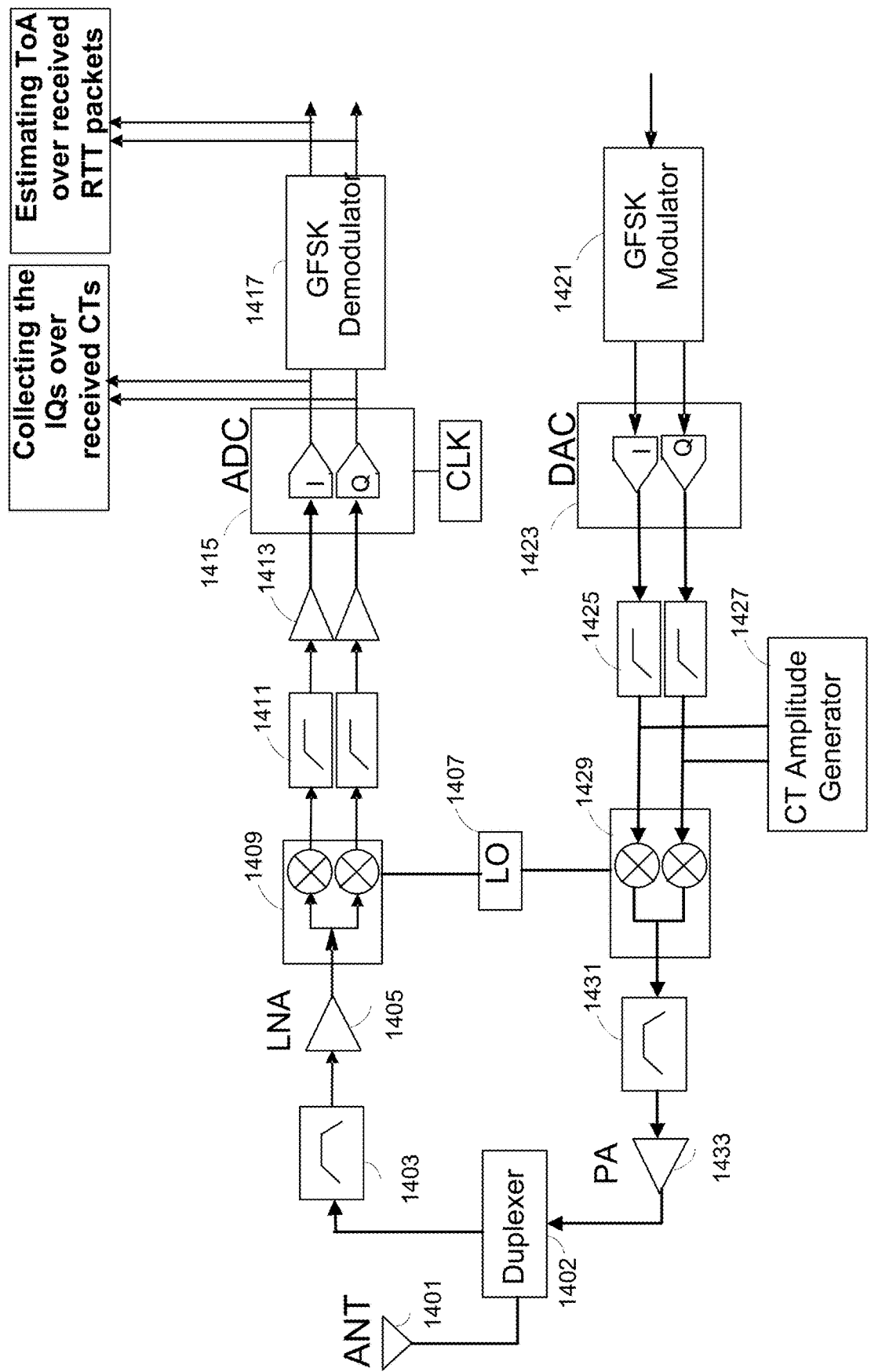
FIG. 14 illustrates a functional block diagram of a supporting chipset that has dual sensing and adjacent signal transmission functionalities to implement secure phase-based ranging cycles, in accordance with one aspect of the present disclosure.

FIG. 14 illustrates a functional block diagram of a supporting chipset that has dual sensing and adjacent signal transmission functionalities to implement secure phase-based ranging cycles, in accordance with one aspect of the present disclosure.

When configured as a sensor, the supporting chipset may receive a BLE signal containing a CT for phase measurements or a Gaussian frequency shift keying (GFSK) modulated RTT packet for ToA estimates during the CT or RTT packet exchange between the initiator and reflector, respectively. An antenna 1401 may receive the BLE signal. A duplexer may provide isolation between the received BLE signal and a transmit BLE signal path when the supporting chipset is configured as an adjacent signal transmitter. A bandpass filter 1403 centered at the channel of the received signal may filter the receive signal to generate a bandpass signal containing the RTT packet or the CT. A low noise amplifier (LNA) 1405 may amplify the bandpass signal. A downconverter 1409 may mix the amplified bandpass signal with a local oscillator (LO) 1407 tuned to the center frequency of the channel to generate a downconverted quadrature signal. A low pass filter 1411 may filter the downconverted quadrature signal to generate a baseband quadrature signal. An amplifier 1413 may amplify the baseband quadrature signal to generate an amplified baseband quadrature signal. An analog-to-digital converter (ADC) 1415 may sample the amplified baseband quadrature signal with a sampling clock to generate a digital baseband quadrature signal. If the BLE received signal is a CT signal, the digital baseband quadrature signal may represent the quadrature samples of the CT signal. If the received signal is a RTT packet, a GFSK demodulator 1417 may demodulate the digital baseband quadrature signal to recover the RTT packet and to estimate the ToA of the RTT packet.

When configured as an adjacent signal transmitter, the supporting chipset may transmit a GFSK modulated RTT packet signal or a CT signal on an adjacent channel (e.g., ±2 MHz or ±4 MHz) of the RTT packet or CT transmission from the main hub, respectively. A GFSK 1421 modulator may generate a GFSK modulated RTT packet signal in baseband in the digital domain. A digital-to-analog converter (DAC) 1423 may convert the GFSK modulated RTT packet signal from the digital domain to an analog representation. A lowpass filter 1425 may filter the analog GFSK modulated RTT packet signal to generate a baseband RTT packet signal. An upconverter 1429 may mix the baseband RTT packet signal with the LO 1407 tuned to the adjacent channel to generate an upconverted RTT packet signal centered at the adjacent channel. If the adjacent signal transmission is for a CT signal, the upconverter 1429 may mix an amplitude output from a CT amplitude generator 1427 with the adjacent channel carrier frequency of the LO 1407 to generate an upconverted CT signal at the adjacent channel. A bandpass filter 1431 centered at the adjacent channel may filter the upconverted RTT packet signal or the upconverted CT signal to generate a bandpass signal. A power amplifier (PA) 1433 may amplify the bandpass signal to generate a BLE transmit signal. The duplexer 1402 may supply the BLE transmit signal to the antenna 1401 for transmission.

Figure 15:
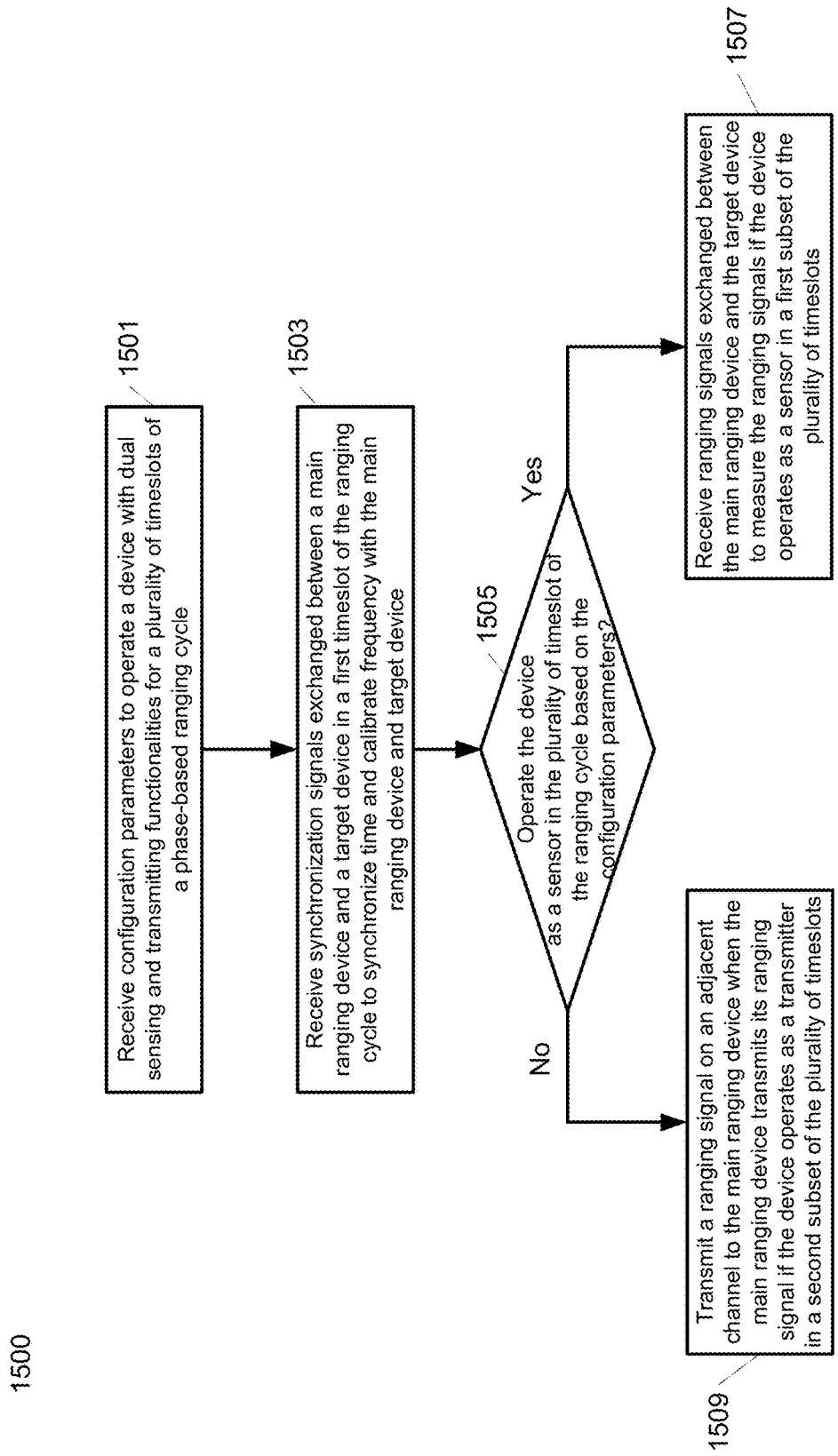
FIG. 15 illustrates a flow diagram of a method 1500 for operating a device that shares sensing and adjacent signal transmission functionalities to support secure multi-carrier phase-based ranging between a main ranging device and a target device, in accordance with one aspect of the present disclosure.

FIG. 15 illustrates a flow diagram of a method 1500 for operating a device that shares sensing and adjacent signal transmission functionalities to support secure multi-carrier phase-based ranging between a ranging device and a target device, in accordance with one aspect of the present disclosure. In one aspect, the method 1500 may be performed by the supporting chipset of FIG. 1-14 utilizing hardware, software, or combinations of hardware and software.

In operation 1501, the device with the dual sensing and transmitting functionalities receives configuration parameters to configure operations of the device for a plurality of timeslots of a phase-based ranging cycle. In one aspect, the device may receive the configuration parameters from a host of a phase-based ranging system that includes a ranging device and the device having the dual sensing and transmitting functionalities. In one aspect, the configuration parameters may include the scheduled number of timeslots in the ranging cycle, the role of the device as a sensor or an adjacent signal transmitter in the timeslots, operating frequency channels of the timeslots, start time of the ranging cycle, start time of the timeslots, information on the type of timeslots, etc. In one aspect, the type of the timeslots may include a timeslot for the ranging device and the target device to exchange only CT signals, only RTT packets, or a combination of CT and RTT packets.

In operation 1503, the device receives synchronization signals exchanged between the ranging device and the target device in a first timeslot of the ranging cycle for the device to synchronize time and calibrate frequency with the ranging device and the target device. In one aspect, during this timeslot, also referred to as the calibration-synchronization timeslot, the device may operate as a sensor to receive the RTT packets exchanged between the ranging device and the target device to synchronize its timing reference with the RTT packet exchange. In one aspect, the device may receive a CT signal from the target device at a known carrier frequency to measure the frequency error offset of the device from the target device.

In operation 1505, the device determines whether to operate the device as a sensor or as a transmitter in the plurality of timeslot of the ranging cycle based on the configuration parameters.

In operation 1507, in a first subset of the plurality of timeslots when the device is scheduled to operate as a sensor, the device receives ranging signals exchanged between the ranging device and the target device in the first subset of timeslots. In one aspect, the device may receive the CT signals or the RTT packets exchanged between the ranging device and the target device on the same channel as the ranging device and the target device. The device may receive the CT signals exchanged between the ranging device and the target device to perform phase measurement of the CT signals. The device may receive the RTT packets exchanged between the ranging device and the target device to estimate TDoA of the RTT packets.

In operation 1509, in a second subset of the plurality of timeslots when the device is scheduled to operate as a transmitter, the device transmits a ranging signal on an adjacent channel of the ranging device during the time that the ranging device transmits its ranging signal in the second subset of timeslots. In one aspect, the device may transmit a RTT packet on an adjacent channel (e.g., ±2 MHz or ±4 MHz) of the ranging device's channel when the ranging device is transmitting a RTT packet to the target device. In one aspect, the device may transmit a CT signal on an adjacent channel of the ranging device's channel when the ranging device is transmitting a CT signal to the target device.

Various embodiments of the multi-carrier phase-based ranging system described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for ranging between a ranging device and a target device, comprising:
    determining by a first device having dual sensing and transmission functionalities whether to operate the first device as a sensor or as a transmitter in a plurality of timeslots of a ranging cycle, wherein the first device and a second device are co-located within the ranging device with known relative positions;
    in response to determining to operate the first device as a sensor in a first subset of the plurality of timeslots of the ranging cycle, receiving by the first device a plurality of first ranging signals exchanged between the second device and the target device on an operating channel of the second device in the first subset of the plurality of timeslots to measure the plurality of first ranging signals; and
    in response to determining to operate the first device as a transmitter in a second subset of the plurality of timeslots of the ranging cycle, transmitting, by the first device in the second subset of the plurality of timeslots, a second ranging signal on an adjacent channel of an operating channel of the second device when the second device transmits a third ranging signal on the operating channel in the second subset of the plurality of timeslots.

2. The method of claim 1, wherein determining whether to operate the first device as a sensor or as a transmitter in the plurality of timeslots of the ranging cycle comprises performing said determining based on configuration parameters, wherein the configuration parameters comprise:
    a role of the first device as a sensor or as a transmitter in each timeslot of the plurality of timeslots;
    a channel to receive the plurality of first ranging signals exchanged between the second device and the target device when the first device operates as a sensor for one or more of the plurality of timeslots; and
    the adjacent channel to transmit the second ranging signal when the first device operates as a transmitter for any of the plurality of timeslots.

3. The method of claim 1, wherein operating the first device as a sensor for receiving a plurality of first ranging signals exchanged between the second device and the target device in the first subset of the plurality of timeslots of the ranging cycle comprises:
    operating the first device as the sensor in a first timeslot at a selected channel operated by the second device and the target device;
    receiving round-trip time (RTT) packets exchanged between the second device and the target device to synchronize time of the first device with the second device and the target device; and
    receiving a continuous tone (CT) signal from the second device or the target device to calibrate the frequency of the device.

4. The method of claim 1, wherein receiving a plurality of first ranging signals exchanged between the second device and the target device comprises:
    receiving a plurality of round-trip time (RTT) packets exchanged between the second device and the target device on the operating channel of the second device or the target device to perform time-difference-of-arrival (TDoA) estimates of the RTT packets from the second device or the target device; or
    receiving a plurality of continuous tone (CT) signal exchanged between the second device and the target device on the operating channel of the second device or the target device to perform phase measurements of the CT signals.

5. The method of claim 4, further comprising:
    transmitting by the first device the TDoA estimates or the phase measurements to a host device to estimate a range of the target device from the ranging device.

6. The method of claim 1, wherein transmitting the second ranging signal on the adjacent channel of the operating channel of the second device comprises:
    transmitting a first round-trip time (RTT) packet on the adjacent channel when the second device transmits a second RTT packet on the operating channel to the target device; or
    transmitting a first continuous tone (CT) signal on the adjacent channel when the second ranging device transmits a second CT signal on the operating channel to the target device.

7. The method of claim 1, wherein the adjacent channel has an offset of between 2 to 4 MHz from the operating channel of the second device.

8. The method of claim 1, wherein determining whether to operate the first device as a sensor or as a transmitter comprises:
    operating the first device as a sensor for all of the plurality of time slots for a first set of the ranging cycles to receive the plurality of first ranging signals exchanged between the second device and the target device; and operating the first device as a transmitter for one or more of the plurality of timeslots for a second set of the ranging cycle to transmit the second ranging signal on the adjacent channel of the operating channel of the second device.

9. The method of claim 1, further comprising:
configuring the first device as the second device
to operate as both a sensor and a transmitter in one or more of the plurality of timeslots to exchange the plurality of first ranging signals with the target device.

10. An apparatus comprising:
a receiver configured to receive first ranging signals;
a transmitter configured to transmit second ranging signals; and
a processing system configured to:
determine whether to operate the receiver or the transmitter in a plurality of timeslots of a ranging cycle;
in response to a determination to operate the receiver in a first subset of the plurality of timeslots of the ranging cycle, process a plurality of the first ranging signals exchanged between a ranging device and a target device received by the receiver on an operating channel of the ranging device in the first subset of the plurality of timeslots to measure the plurality of first ranging signals, wherein the apparatus and the ranging device are co-located within a same device with known relative positions; and
in response to a determination to operate the transmitter in a second subset of the plurality of timeslots of the ranging cycle, transmit in the second subset of the plurality of timeslots, the second ranging signal on an adjacent channel of an operating channel of the ranging device when the ranging device transmits a third ranging signal on the operating channel in the second subset of the plurality of timeslots.

11. The apparatus of claim 10, wherein the processor is configured to determine whether to operate the receiver or the transmitter in the plurality of timeslots of the ranging cycle based on configuration parameters, wherein the configuration parameters comprise:
information to operate the receiver or the transmitter in each timeslot of the plurality of timeslots;
a channel used by the receiver to receive the plurality of first ranging signals exchanged between the ranging device and the target device when the receiver is operated for one or more of the plurality of timeslots; and
the adjacent channel used to transmit the second ranging signal when the transmitter is operated for any of the plurality of timeslots.

12. The apparatus of claim 10, wherein to operate the receiver in the first subset of the plurality of timeslots of the ranging cycle, the processing system is configured to:
operate the receiver in a first timeslot at a selected channel operated by the ranging device and the target device;
process round-trip time (RTT) packets exchanged between the ranging device and the target device received by the receiver to synchronize time of the apparatus with the ranging device and the target device; and
process a continuous tone (CT) signal received by the receiver from the ranging device or the target device to calibrate the frequency of the apparatus.

13. The apparatus of claim 10, wherein to process the plurality of the first ranging signals exchanged between the ranging device and the target device, the processing system is configured to:

process a plurality of round-trip time (RTT) packets exchanged between the ranging device and the target device on the operating channel of the ranging device or the target device to perform time-difference-of-arrival (TDoA) estimates of the RTT packets from the ranging device or the target device; or
process a plurality of continuous tone (CT) signal exchanged between the ranging device and the target device on the operating channel of the ranging device or the target device to perform phase measurements of the CT signals.

14. The apparatus of claim 13, wherein the processing system is further configured to:
transmit the TDoA estimates or the phase measurements to a host device to estimate a range of the target device from the ranging device.

15. The apparatus of claim 10, wherein to transmit the second ranging signal on the adjacent channel of the operating channel of the ranging device, the processing system is configured to:
transmit a first round-trip time (RTT) packet on the adjacent channel when the ranging device transmits a second RTT packet on the operating channel to the target device; or
transmit a first continuous tone (CT) signal on the adjacent channel when the ranging device transmits a second CT signal on the operating channel to the target device.

16. The apparatus of claim 10, wherein adjacent channel has an offset of between 2 to 4 MHz from the operating channel of the ranging device.

17. The apparatus of claim 10, wherein to determine whether to operate the receiver or the transmitter in the plurality of timeslots of the ranging cycle, the processing system is configured to:
operate the receiver for all of the plurality of time slots for a first set of the ranging cycles to receive the plurality of first ranging signals exchanged between the ranging device and the target device; and
operate the transmitter for one or more of the plurality of timeslots for a second set of the ranging cycle to transmit the second ranging signal on the adjacent channel of the operating channel of the ranging device.

18. The apparatus of claim 10, wherein the processing system is further configured to:
configure the apparatus as the ranging device; and
operate the apparatus as both a receiver and a transmitter in one or more of the plurality of timeslots to exchange the plurality of first ranging signals with the target device.

19. A system comprising:
a host device;
a main device that includes a main receiver and a main transmitter configured to exchange ranging signals with a target device;
one or more supporting devices, wherein the supporting devices and the main device are co-located within the system with known relative positions, wherein each of the supporting devices includes:
a receiver configured to receive first ranging signals;
a transmitter configured to transmit second ranging signals; and
a processing system configured to:
determine whether to operate the receiver or the transmitter in a plurality of timeslots of a ranging cycle;

in response to a determination to operate the receiver in a first subset of the plurality of timeslots of the ranging cycle, process a plurality of the first ranging signals exchanged between the main device and the target device received by the receiver on an operating channel of the main device in the first subset of the plurality of timeslots to perform measurements of the plurality of first ranging signals;

in response to a determination to operate the transmitter in a second subset of the plurality of timeslots of the ranging cycle, transmit, in the second subset of the plurality of timeslots, the second ranging signal on an adjacent channel of an operating channel of the main device when the main device transmits a third ranging signal on the operating channel in the second subset of the plurality of timeslots; and transmit the measurements of the plurality of first ranging signals to the host device to estimate a range of the target device from the system.

20. The system of claim 19, wherein the host device configures:

a different subset of the one or more supporting devices to operate the corresponding receiver for all of the plurality of time slots in a first one of the ranging cycle from a second one of the ranging cycle to receive the plurality of first ranging signals exchanged between the main device and the target device, and a remaining subset of the one or more supporting devices in the first one and the second one of the ranging cycle to operate as a transmitter for one or more of the plurality of timeslots to transmit the second ranging signal on the adjacent channel of the operating channel of the main device.

* * * * *